US011468670B2

(12) United States Patent
Schumann et al.

(10) Patent No.: US 11,468,670 B2
(45) Date of Patent: Oct. 11, 2022

(54) DETECTION AND MANAGEMENT OF TARGET VEGETATION USING MACHINE VISION

(71) Applicant: University of Florida Research Foundation, Inc., Gainesville, FL (US)

(72) Inventors: Arnold W. Schumann, Auburndale, FL (US); Nathan S. Boyd, Brandon, FL (US); Jialin Yu, Riverview, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 330 days.

(21) Appl. No.: 16/757,159

(22) PCT Filed: Nov. 2, 2018

(86) PCT No.: PCT/US2018/058829
§ 371 (c)(1),
(2) Date: Apr. 17, 2020

(87) PCT Pub. No.: WO2019/094266
PCT Pub. Date: May 16, 2019

(65) Prior Publication Data
US 2020/0342225 A1 Oct. 29, 2020

Related U.S. Application Data

(60) Provisional application No. 62/582,744, filed on Nov. 7, 2017, provisional application No. 62/671,144, filed on May 14, 2018.

(51) Int. Cl.
*A01M 7/00* (2006.01)
*G06V 20/10* (2022.01)
(Continued)

(52) U.S. Cl.
CPC ......... *G06V 20/188* (2022.01); *A01M 7/0089* (2013.01); *A01M 21/043* (2013.01);
(Continued)

(58) Field of Classification Search
CPC .... A01M 21/043; G06N 20/00; G06V 20/188
See application file for complete search history.

(56) References Cited

U.S. PATENT DOCUMENTS 6,070,539 A 6/2000 Flamme et al.
6,199,000 B1 3/2001 Keller et al.
(Continued)

FOREIGN PATENT DOCUMENTS

| CN | 106295543 A | * | 1/2017 | ......... G06K 9/00657 |
| WO | 2017178666 A1 | | 10/2017 | |
| WO | WO-2017178666 A1 | * | 10/2017 | |

OTHER PUBLICATIONS

Esau et al., Economic Analysis for Smart Sprayer Application in Wild Blueberry Fields, Precision Agriculture, vol. 17, pp. 753-765, Apr. 2016 (Year: 2016).*
(Continued)

*Primary Examiner* — Charles Tseng
(74) *Attorney, Agent, or Firm* — Thomas | Horstemeyer, LLP

(57) ABSTRACT

Various embodiments detect and manage target vegetation in vegetation areas, including crop beds, between crop beds, and turfgrasses. In one embodiment, a machine learning model is trained to detect target vegetation in captured images. An information processing system is programmed utilizing the machine learning model. One or more images of a particular area are captured, and target vegetation is detected within the one or more images. A position of the detected target vegetation is determined within the one or more images. An applicator disposed on an agrochemical (Continued)

applicator system that is mapped to the position of the detected target vegetation within the one or more images is determined. The applicator is activated based on a current speed of a vehicle coupled to the agrochemical applicator system, and further based on configuration data associated with the applicator. Activating the applicator selectively applies an agrochemical to the detected target vegetation.

20 Claims, 13 Drawing Sheets

(51) Int. Cl.
    *G06T 7/70*          (2017.01)
    *G06N 20/00*       (2019.01)
    *A01M 21/04*       (2006.01)

(52) U.S. Cl.
    CPC ............... *G06N 20/00* (2019.01); *G06T 7/70* (2017.01); *G06T 2207/20081* (2013.01); *G06T 2207/30188* (2013.01)

(56) References Cited

U.S. PATENT DOCUMENTS

2013/0235183 A1    9/2013    Redden
2017/0202132 A1    7/2017    Maust et al.

OTHER PUBLICATIONS

Esau et al., Spot-Application of Fungicide for Wild Blueberry Using an Automated Prototype Variable Rate Sprayer, Precision Agriculture, vol. 15, pp. 147-161, May 2013 (Year: 2013).*
English Translation of CN 106295543, 2017 (Year: 2017).*
English Translation of WO 2017178666, 2017 (Year: 2017).*
International Search Report in co-pending Related PCT Application No. PCT/US2018/058829, dated Jan. 18, 2019.

* cited by examiner

DETECTION AND MANAGEMENT OF TARGET VEGETATION USING MACHINE VISION

CROSS-REFERENCE TO RELATED APPLICATIONS

This application is the 35 U.S.C. § 371 national stage application of PCT application having application number PCT/US2018/058829, filed on Nov. 2, 2019 which claims the benefit of and priority to U.S. Provisional Patent Application No. 62/582,744, filed on Nov. 7, 2017, entitled "DETECTION AND MANAGEMENT OF TARGET VEGETATION IN CROPPING SYSTEMS USING MACHINE VISION," and co-pending U.S. Provisional Patent Application No. 62/671,144, filed on May 14, 2018, entitled "DETECTION AND MANAGEMENT OF TARGET VEGETATION USING MACHINE VISION," the contents of which are incorporated by reference herein in their entirety.

BACKGROUND

The present disclosure generally relates to object detection systems, and more particularly relates to identifying and managing target vegetation using machine vision.

Undesirable vegetation such as weeds and/or diseased vegetation presents a significant problem to the agricultural industry and the turf industry. Weed control is a significant issue in agricultural production. If uncontrolled, weeds compete with crops for nutrients, soil moisture, and sunlight and can have a detrimental effect on crop yield and quality Weeds can also reduce aesthetics, functionality, and surface quality of turfgrasses. Agrochemicals are generally applied to eradicate or at least manage unwanted vegetation. The spatial non-uniformity in weed populations provide an opportunity for automated selective spraying of weeds and/or diseased vegetation. However, conventional methods usually apply the agrochemicals in a non-selective manner where the chemicals are not only applied to the unwanted vegetation but also the crops and/or turfgrass as well. This broadcast application of agrochemicals can damage crops and turfgrass, introduce unwanted chemicals into the crops and/or turfgrass, increase costs by wasting the agrochemicals, and/or the like.

BRIEF SUMMARY

The present disclosure relates to systems and methods for detecting and managing target vegetation. In some embodiments of the present disclosure, target vegetation can be detected and managed within and/or between a crop bed. In other embodiments of the present disclosure, target vegetation can be detected in turfgrass (e.g., lawns, golf courses, sod farms, sports fields, etc.). The method comprises training a machine learning model to detect target vegetation in digital images and/or video. An information processing system is programmed utilizing the machine learning model. For crop systems, one or more images of a crop bed (and/or area between a crop beds) are captured, and target vegetation is detected within the one or more images. Likewise, for turfgrass, one or more images of a turf area are captured, and target vegetation is detected within the one or more images.

A position of the detected target vegetation is determined within the one or more images. An applicator disposed on an agrochemical applicator system that is mapped to the position of the detected target vegetation within the one or more images is determined. The applicator is activated based on a current speed of a vehicle coupled to the agrochemical applicator system, and further based on configuration data associated with the applicator such as inherent latencies due to valve response times and "time of flight" of the liquid spray. Activating the applicator selectively applies an agrochemical to the detected target vegetation.

In other embodiments of the present disclosure, a system for detecting and managing target vegetation is provided. The system comprises a movable entity and an agrochemical applicator system operatively coupled to the movable entity. The agrochemical applicator system comprises one or more tanks comprising at least one agrochemical, and one or more applicators configured to dispense the agrochemical. The agrochemical applicator system further comprises an imaging system comprising at least one imaging device and a location determining system. The agrochemical applicator system also comprises an application manager. The application manager is configured with a previously trained machine learning model to detect target vegetation, and receiving one or more images of a crop bed (and/or an area between crop beds) and/or turfgrass from the imaging system. The application manager is further configured to detect target vegetation within the one or more images utilizing the trained machine learning model. The application manager determines a position of the detected target vegetation within the one or more images based on data received from the location determining system and the pixel coordinates of the detected target vegetation in the image(s). The application manager also determines an applicator from the one or more applicators that is mapped to the position of the detected target vegetation within the one or more images. The application manager then activates the applicator at the correct time based on a current speed of the movable entity and further based on configuration data associated with the applicator. Activating the applicator selectively applies an agrochemical to the detected target vegetation.

In some embodiments, the data associated with the detection and treatment of target vegetation can be recorded and mapped for future use. For example, maps can be generated based on the calculated, obtained, and/or recorded data associated with the detection and management of the target vegetation. These maps can be used for pretreatment of areas that may be prone to reoccurrence.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 10A-13B illustrate example images showing detection of targeted vegetation according to various embodiments of the present disclosure. In particular, FIGS. 10A, 11A, 12A, and 13A illustrate examples images of vegetation, and FIGS. 10B, 11B, 12B, and 13B illustrate examples images showing detection of the unwanted vegetation in the images.

DETAILED DESCRIPTION

Figure 1:
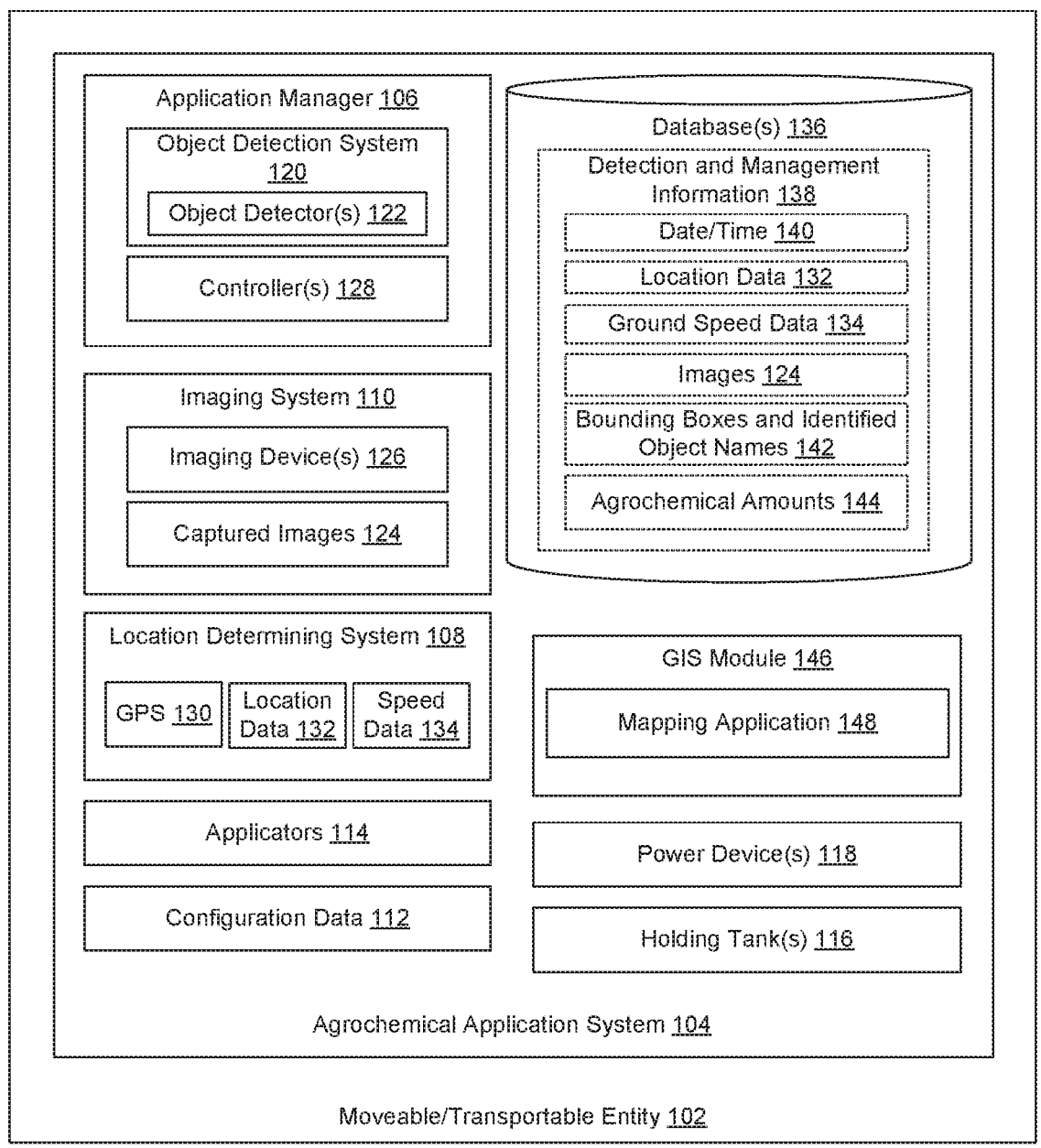
FIG. 1 is a block diagram illustrating one example of a system for detecting and managing target vegetation according to one embodiment of the present disclosure.

FIG. 1 shows one example of a system 100 for identifying and managing target vegetation according to various embodiments of the present disclosure. In one embodiment, the system 100 comprises a movable/transportable entity 102 such as (but not limited to) a vehicle, wagon, cart, and/or the like. Examples of a vehicle include (but are not limited to) a tractor, truck, all-terrain vehicle, car, or any other motorized vehicle. The movable entity 102 is coupled to an agrochemical application system (AAS) 104. In one embodiment, the AAS 104 may be a portable system that is removably coupled to the movable entity 102. In other embodiments, the AAS 104 is permanently fixed to the movable entity 102. The AAS 104 may be pushed, pulled, and/or carried by the movable entity 102.

According to various embodiments, the AAS 104 can comprise an application manager 106, a location determining system (LDS) 108, an imaging system 110, application system configuration data 112, one or more applicators 114 one or more holding tanks 116, one or more power devices 118, a database 136, a geographic information system (GIS) module 146, and/or any other systems as can be appreciated. In one embodiment, the application manager 106 is a computing system, which may be a specialized computing system configured to manage/control application of agrochemicals within a holding tanks(s) 116 to target vegetation. In some embodiments, the target vegetation is undesirable vegetation such as weeds growing within crop beds and/or between crop beds. One non-limiting example of a weed is purple nutsedge. However, embodiments of the present disclosure are applicable to other undesirable vegetation as well. In other embodiments, the target vegetation can comprise undesirable vegetation such as weeds growing within turfgrass, diseased vegetation within the turfgrass and/or crop beds, and/or any other type of vegetation as can be appreciated. The turf can comprise dormant turf, non-dormant turf, and/or any other type of turf as can be appreciated.

In one embodiment, the application manager 106 comprises an object detection system (ODS) 120. The ODS 120 comprises one or more object detectors 122 trained to identify target vegetation within images 124 captured by one or more imaging devices 126 of the imaging system 110. In other embodiments, the ODS 120 may reside within an information processing system communicatively coupled to the application manager 160. This information processing system may be disposed on the movable entity 102 and/or the AAS 104 or may reside at a remote location. In one or more embodiments, the information processing system comprising the ODS 120 may be a cloud-computing based system. In some embodiments, the application manager 106 comprises (or is externally coupled to) a dedicated graphics processing unit (GPU) optimized for rapid deep learning inference operations on digital images. In this embodiment, the GPU is the ODS 120 and utilizes the one or more object detectors 122 trained to identify target vegetation within images 124 captured by one or more imaging devices 126 of the imaging system 110. It should be noted that in some embodiments, one or more components of the AAS 104 may be combined and/or may be implemented at a location external to the AAS 104 and/or the movable entity 102.

As will be discussed in greater detail below, when an object detector 122 of the ODS 120 detects an instance of target vegetation within a captured image 124, the application manager 106 activates one or more applicators 114 to selectively address the detected target vegetation. Target vegetation may be selectively address utilizing various mechanisms. For example, a mechanical mechanism (e.g., tillers, clippers, sandblaster, etc.) may be activated to selectively remove only the target vegetation without the use of chemicals while the desired vegetation remains intact. In another embodiment, one or more applicators may be activated to selectively apply steam or an agrochemical (e.g., herbicide, fungicide, etc.) to the detected target vegetation (e.g., weeds, diseased vegetation, etc.) and not to other vegetation such as, for example, crops and/or turfgrass. In some embodiments, the agrochemical(s) is maintained within the holding tank(s) 116, which may or may not be pressurized. In another embodiment, the tank 116 may also hold water coupled to a steam generator. The applicators 114 may include solenoid valves, actuators, and/or any other mechanisms that control the flow of agrochemicals or steam out through a nozzle.

The application manager 106, in one embodiment, activates (and de-activates) an applicator(s) 114 by issuing a computer executable instruction(s) and/or other electrical signals to one or more controllers 128 communicatively coupled to the applicators 114. The controller(s) 128 may be part of or external to the application manager 106. The controller(s) 128 then activate/de-activate the applicator(s) 114 in response to the computer executable instructions and/or other electrical signals. In other embodiments, the application manager 106 generates one or more electrical signals that activate a solenoid, switch, relay, etc. instead of or in addition to issuing computer executable instructions.

In one embodiment, the imaging system 110 comprises one or more imaging capturing devices 126 (also referred to herein as "imaging devices 126") such as cameras. The imaging devices 126 capture images/frames 124 of a video sequence or still photo sequence of an external environment. It should be noted that if multiple imaging devices 126 are implemented, two or more of these devices may have overlapping fields of view. The captured images 124 are then stored in a storage device local to the imaging system 110, application manager 106, and/or the application system 104. In another embodiment, the captured images 124 are stored on a system that is external to the application system 104 and/or the movable entity 102. In yet a further embodiment, the captured images 124 may be transmitted to the application manager 106 or external object detection system for processing in real-time. The captured images 124 may be communicated to the various components of the application system 104 and/or external devices via wired and/or wireless communication mechanisms.

The LDS 108, in one embodiment, comprises a Global Positioning System (GPS) module 130, which generates and records location data 132 and speed data 134 of the application system 104. In one embodiment, the location data 132 and speed data 134 may be stored in a storage device local to the LDS 108, the application manager 106, the database 136, and/or the application system 104. In another embodiment, the location data 132 and speed data 134 are stored on a system that is external to the application system 104 and/or the movable entity 102. In yet another embodiment, the location data 132 and speed data 134 may be transmitted to the application manager 106 in real-time. The location data 132 and speed data 134 may be communicated to the various components of the application system 104 and/or external devices via wired and/or wireless communication mechanisms.

As will be discussed in greater detail below, the application manager 106 utilizes at least the speed data 134 generated by the GPS module 130 and the configuration data 112 to determine when an applicator(s) 114 is to be activated based on target vegetation being detected within a captured image 124 by the ODS 120. In some embodiments, the application manager 106 may also use the speed data 134 and the configuration data 112 to determine where to position the applicator(s) 114, how long to delay activation of the applicator(s) 114 if needed, and/or the like. In one embodiment, the configuration data 112 comprises information such as the position and distance of the applicator(s) 114 and the imaging device(s) 126 with respect to each other, the dispensing angle of the applicator(s) 114, coverage area of the applicator(s) 114, actuation speed of the applicator(s) 114, field-of-view of the imaging device(s) 126, distance of the applicator(s) 114 to the ground, location of the applicator(s) 114 on the application system 104, location of the imaging device(s) 126 on the application system 104, mapping of a given applicator 114 to a corresponding portion of the imaging device's field-of-view and/or captured images 124, and/or the like.

Depending on how the applicator(s) 114 are implemented within the application system 104, the configuration data 112 may also include additional information. For example, the applicator(s) 114 may be implemented on a motorized track that automatically positions the applicator(s) 114 for selective application of agrochemicals to target vegetation. The motorized track may travel in a direction that is perpendicular and/or parallel to the direction of travel by of movable entity 102. In this embodiment, the configuration data 112 includes additional information such as travel speed of motorized track (which can be a fixed speed or a variable range); current position of applicator(s) 114 on the track, a mapping of the different positions on the motorized track to corresponding portions of the imaging device's field-of-view and/or the captured images 124 and/or the like.

In one embodiment, the configuration data 112 is stored in a storage device local to the application manager 106 and/or the application system 104. In another embodiment, the configuration data 112 is stored on a system that is external to the application system 104 and/or the movable entity 102. The configuration data 112 may be communicated to the various components of the application system 104 and/or external devices via wired and/or wireless communication mechanisms.

In some embodiments, the AAS 104 can include one or more databases 136, such as a structured query language (SQL) database or other appropriate database. The data stored in the database, for example, can include data collected, calculated, and/or recorded, including all geo-tagged data, with respect to the detection and management of targeted vegetation. The database 136 can include detection and management information 138 and/or other information. The detection and management information 138 comprises data calculated, obtained, and/or recorded with respect to the detection and management of the targeted vegetation. For example, the detection and management information 138 can comprise date/time data 140, location data 132, ground speed data 134, images 124, bounding boxes and identified object names 142, agrochemical amounts 144, and/or any other type of data as can be appreciated. The time/date 140 can comprise data associated with time and date of detection and treatment. For example, when a weed is detected in a crop bed and/or turf area and an agrochemical is applied, the time and/or date of the application can be recorded and stored in the database 136. The bounding boxes and identified object names 142 represent the bounding boxes and identified object names. For example, as discussed with respect to FIG. 4, images comprising the target vegetation can be annotated with text and/or the bounding box using specific software. The agrochemical amount 144 includes the amount of agrochemical applied to a targeted vegetation.

According to various embodiments, the AAS 104 can further comprise a GIS module 146 comprising a mapping application 148 that can be used to generate maps for identifying areas where the target vegetation was detected and providing information about the treatment of the detected target vegetation. The GIS module 146 can generate a mapped visualization of the data stored in the one or more databases 136. The generated maps can be a useful feature for turfgrass management and/or horticulture as they will be able to provide where targeted vegetation has occurred. For example, using the knowledge of where targeted vegetation has occurred, a fumigation system could increase the amount of fumigant in a particular area. Likewise, for weed patches and/or diseases in turf, a pre-emergence herbicide could be sprayed at a certain area due to the prior detections.

Figure 2:
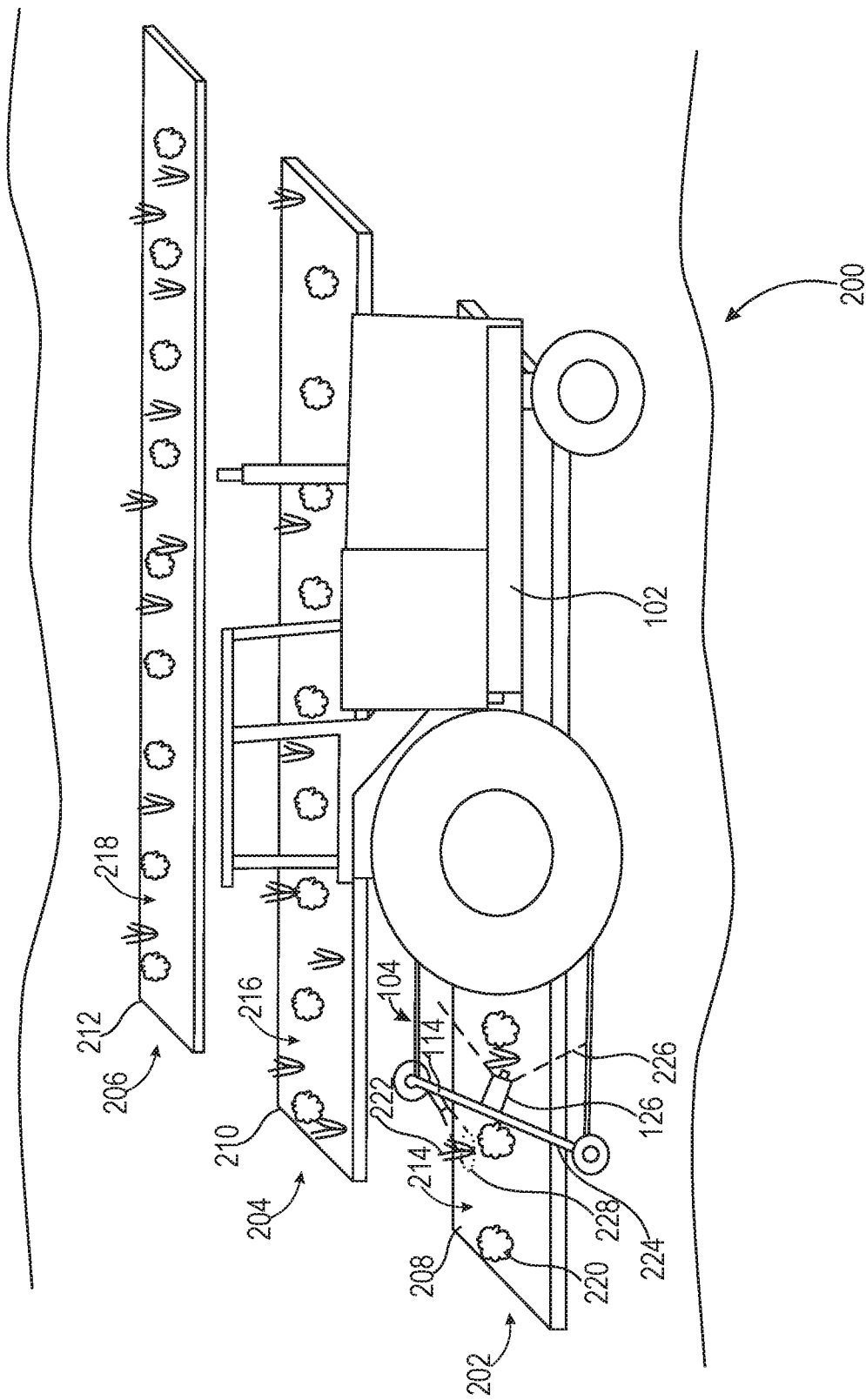
FIG. 2 is an illustrative example of one operating environment implementing the system of FIG. 1 according to one embodiment of the present disclosure.
Figure 3:
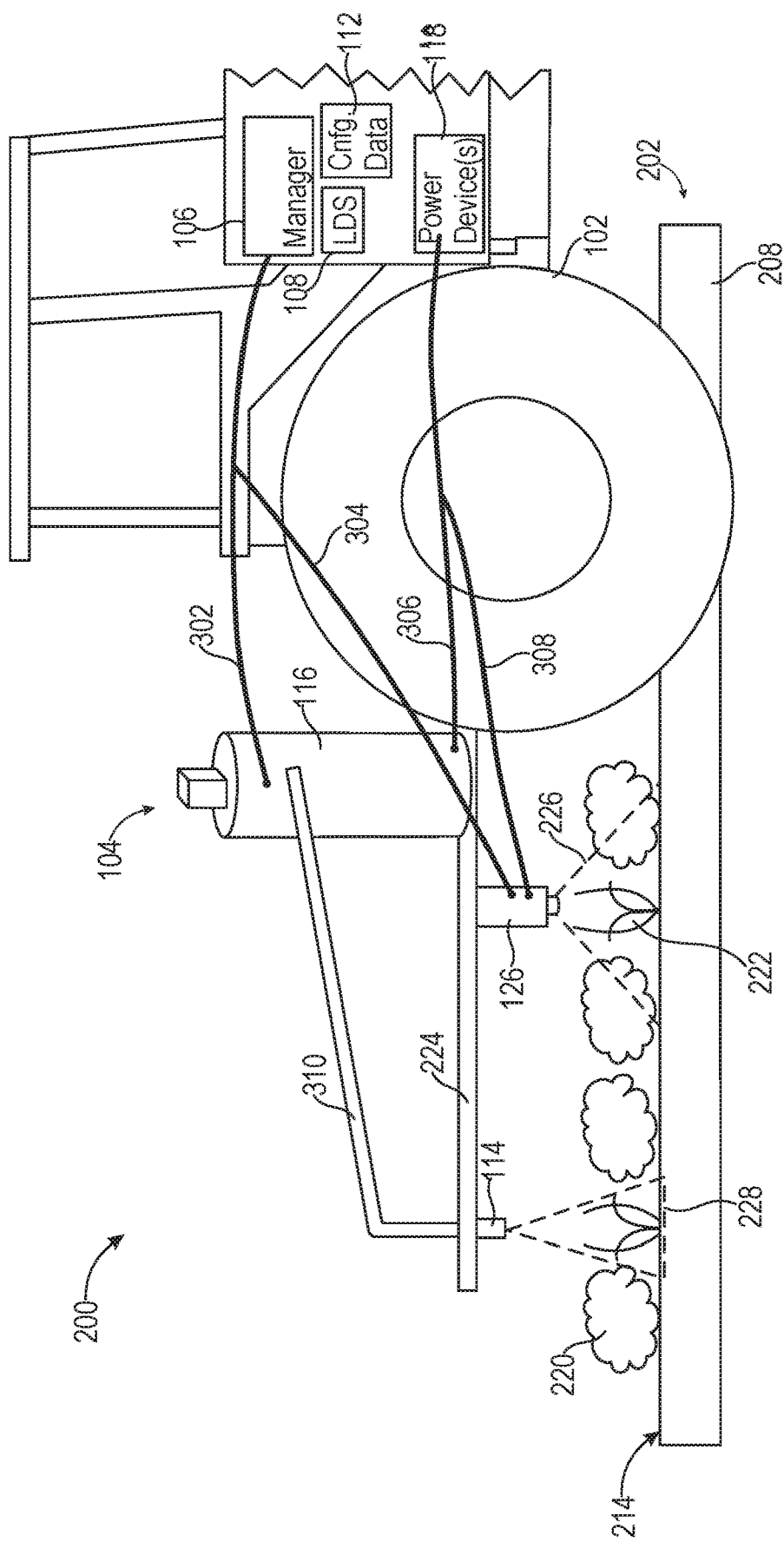
FIG. 3 is another illustrative example of one operating environment implementing the system of FIG. 1 according to one embodiment of the present disclosure.

FIGS. 2 and 3 show illustrative examples of one operating environment 200 applicable to various embodiments of the present invention. The operating environment 200 comprises rows of crops 202, 204, 206 each having a raised crop bed 208, 210, 212, covered by a sheet of plastic mulch 214, 216, 218. It should be noted that although the following discussion utilizes crop beds as one area of interest for the AAS 104, embodiments of the present invention are not limited to such areas. For example, one or more embodiments are also applicable to areas between crop beds, non-raised crop beds, and/or areas with turf grass (e.g., golf courses, sports fields, sod farms, lawns, etc.) as well.

In FIGS. 2 and 3, the crop beds 208, 210, and 212 are shown has having crops 220 and undesirable vegetation 222 such as weeds. One example of a weed is nutsedge, which is able to penetrate through the plastic mulch. The movable entity 102, in this example, is a tractor having the AAS 104 disposed at the rear of the movable entity 102. However, the AAS 104 (or components of the AAS 104) may be implemented at the front and/or side(s) of the movable entity 102 as well. In some embodiments, components of the AAS 104 shown in FIG. 1 such as the application manager 106, the LDS 108, the configuration data 112, and the power device(s) 118 may be implemented within/on the movable entity 102 as shown in FIG. 3. FIG. 3 also shows various coupling mechanisms 302, 304, 306, 308, 310 such as wires, tubes, hoses, etc. between various components of the AAS 104 including the holding tank 116

One or more of the imaging devices 126 are coupled to one or more supporting structures 224 at a fixed or variable angle. The imaging device(s) 126 has a field-of-view 226 at least as wide as the crop bed 208, but the field-of-view 226 may be less in other embodiments. In some embodiments, multiple imaging devices may be disposed on the supporting structure(s) 224 with distinct or overlapping field-of-views. In one embodiment, the imaging device(s) 126 is positioned on the supporting structure 224 so that its field-of-view is centered over the crop bed 208, but may be off-centered in other embodiments.

One or more applicators 114 are also disposed on the same or different supporting structure(s) 224 as the imaging device(s) 126. The one or more or more applicators 114 are controlled by the application manager 106 to selectively apply an agrochemical (e.g., herbicide, fungicide, etc.) to target vegetation 222 (e.g., a weed, diseased vegetation, etc.) without intentionally applying the agrochemical to the desirable vegetation (e.g., the crop 220, turf). Each applicator 114 has a fixed or adjustable spray pattern and coverage area 228. It should be noted that the following discussion utilizes agrochemicals as only one example of a mechanism for managing target vegetation and embodiments of the present invention may utilize other mechanisms such as tillers, clippers, a sandblaster, steam, and/or the like as well.

Figure 4:
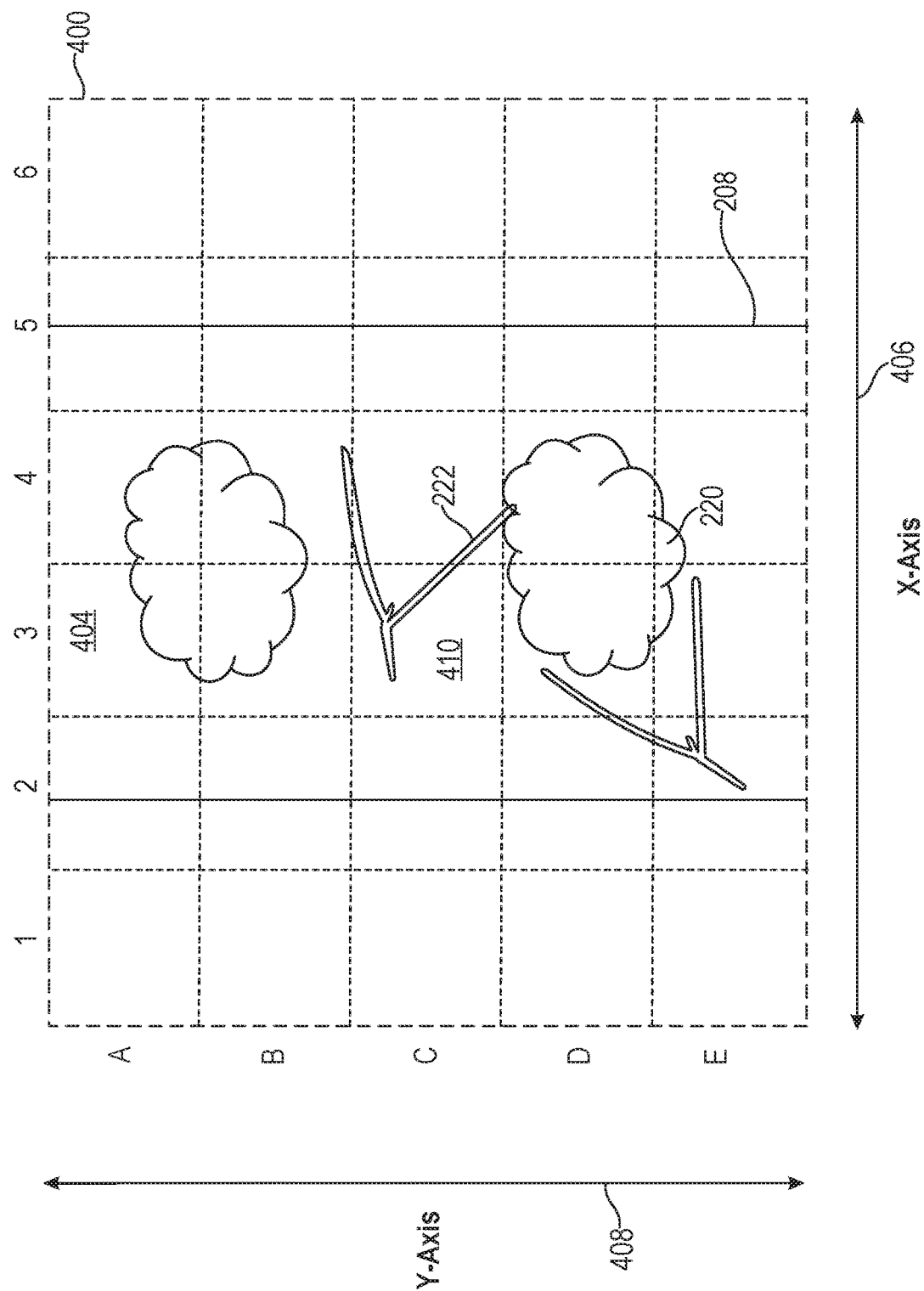
FIG. 4 illustrates one example of a captured image utilized by system of FIG. 1 for detecting and managing target vegetation according to one embodiment of the present disclosure.

In one embodiment, a grid of applicators 114 may be disposed along one or more supporting structures 224 such that an agrochemical (e.g., herbicide, fungicide, etc.) is able to be selectively applied to any given location across a portion of a crop bed 208. For example, FIG. 4 shows a portion of a crop bed 208 divided into an illustrative grid 400 represented by various dashed lines. In this example, each row of the applicator grid corresponds to a given row of the crop bed grid 400. Stated differently, each row of applicators in the applicator grid is responsible for applying an agrochemical to a corresponding row in crop bed grid 400. For example, if the applicator grid is comprised of five rows of applicators, the first row of applicators is responsible for applying an agrochemical to Row_A of the crop bed grid 400, where the fifth row of applicators is responsible for applying an agrochemical to Row_E.

In some embodiments, a more granular configuration may be implemented where each row of the applicator grid comprises one or more applicators 114 assigned to a given each section of a row in crop bed grid 400. For example, if a portion of the crop bed captured by the imaging device(s) is divided into the grid 400 shown in FIG. 4 each row of applicators may comprise six individual applicators. Each applicator 114 in a given row is responsible for applying an agrochemical to a corresponding section/cell within the corresponding row of the crop bed grid 400. For example, a first applicator 114 in the first row of the applicator grid is responsible for applying an agrochemical to Section_A1 402 of the crop bed grid 400, where a third applicator 114 in the first row of the applicator grid is responsible for applying an agrochemical to Section_A3 404 of the grid 400.

In some embodiments, a single applicator 114 may comprise multiple nozzle heads, where each nozzle head is responsible for a given section of the grid 400. For example, the first row of the applicator grid may comprise two applicators 114 each having three nozzle heads. In this example, a first, second, and third nozzle head of the first applicator are configured to respectively apply an agrochemical to Section_A1, Section_A2, and Section_A3 of the grid 400. In addition, a first, second, and third nozzle head within the second applicator are configured to respectively apply an agrochemical to Section_A4, Section_A5, and Section_A6 of the grid.

In another embodiment, a single (or multiple) applicator(s) 114 may be implemented on a motorized track as discussed above. The motorized track automatically positions the applicator(s) 114 for selectively applying of agrochemicals to detected target vegetation. The motorized track may travel in a direction that is perpendicular and/or parallel to the direction of travel of the movable entity 102. Stated differently, the motorized track (s) may travel along the X-axis 406 and/or Y-axis 408 of the grid 400 to position one or more applicators 114 at a given position such as Section_C3 410. In some embodiments, the motorized track(s) may also be configured to move in the z-direction to adjust the vertical distance (with respect to ground) between the applicator 114 and the crop bed. This allows the spray pattern coverage area of the applicator 114 to be reduced or increased.

While the applicator configuration discussed above with respect to FIGS. 2-4 relates to targeted application to patterned rows, it should be noted that the applicator configuration is not limited to particular rows or patterns. For example, in turf applications, weed population presents in non-uniformity and is not limited to a particular row or pattern. As such, to be able to compensate and apply the agrochemical to areas that are not within a patterned configuration, the configuration of applicators 114 for turf detection and treatment may include more applicators 114 and/or nozzles than the configuration of applicators 114 for detection and treatment of targeted vegetation in a crop bed. In some embodiments, the AAS 104 can comprise a horizontal boom sprayer where the nozzles are not pointed. As such, there may be overlapping spray patterns when more than one nozzle is activated. In various embodiments, each nozzle can be individual controlled. For example, the nozzle can comprise a valve that can be controlled via the controller.

As discussed above, the application manager 106 utilizes an object detection system 120 to detect target vegetation within images 124 captured by one or more imaging devices 126. In one embodiment, the object detection system 120 comprises one or more object detectors 122, such as a trained object detection algorithm/model. In one embodiment, the object detection algorithm/model is trained using one or more machine learning techniques. For example, in one embodiment, the object detection algorithm/model is a deep learning artificial neural network (DLANN) model trained to detect weeds such as purple nutsedge among crops and their positions within a captured image. However, other machine learning models are applicable as well. It should be noted that although various embodiments use the purple nutsedge species as an example of the target vegetation, embodiments of the present invention are not limited to such an example. For example, the targeted vegetation can include any type of weed and/or diseased vegetation found within crop beds, turfgrass, and/or any other area of vegetation.

A DLANN model is generally comprised of a plurality of connected units referred to as artificial neurons. Each unit is able to transmit a signal to another unit via a connection there between. A unit that receives a signal from another unit processes the signal and may transmit its own signal to another unit based on the processed signal. A unit may be associated with a state (e.g., $0 \leq x \leq 1$) where both a unit and a connection may be associated with a weight that affects the strength of the signal transmitted to another unit. The weight may vary during the learning process of the model. The model may comprise multiple layers of connected units, where different layers perform different transformations on their inputs. The first layer acts as the initial input (from the captured image) to the model, where signals from this layer propagate to the final layer (identified object). The initial layers of the model may detect specific characteristics of the target object while inner layers may detect more abstract characteristics based on the output of the initial layers. The final layers may then perform more a complex detection based on the output of the inner layers to detect the target object.

The DLANN model utilized by the application manager 106 is trained by providing training data to the model as an input. The model may be trained at the application manager 106 and/or at an external information processing system. In one embodiment, the training data comprises multiple different images of a target object such as purple nutsedge and, optionally, multiple different images not comprising the target object. In one non-limiting example, the environment in which the AAS 104 is implemented comprises rows of crops with a raised crop bed covered by a sheet of plastic mulch, as discussed above with respect to FIGS. 2 and 3. In this environment, purple nutsedge is able to penetrate uncompromised sections of the plastic mulch. Therefore, the training data for this environment may comprise a plurality of different images taken of crop beds comprising plastic mulch, images comprising nutsedge that has penetrated the plastic mulch, images comprising non-target vegetation such as the crop, and images comprising both nutsedge and the crop.

One example of a training image is similar to FIG. 4 without the grid lines where a crop bed 208 is covered by a sheet of plastic mulch 214 and comprises a target object 222 (e.g., nutsedge and a non-target object 220 (e.g., crop)). In some embodiments, images comprising the target vegetation (e.g., purple nutsedge) may be annotated with text and/or a bounding box using specific software. In one embodiment, the training images are sized according to the size of the application area of the applicators 114. For example, the training images may each be 1247×347 pixels, which correspond to the spray area of the applicators 114 in one example. It should be noted that other images of purple nutsedge not associated with the environment can be used as training data as well. It should be also noted that embodiments of the present invention are not limited to the above environment or purple nutsedge. Other environments and target vegetation are applicable as well.

In some embodiments, the model comprises a convolution layer where a sliding window is passed over each of the training images where each portion of the training image is saved as a separate image. Each of these separate images for each original training file are then fed into the model as training data. The result of this training step is an array that maps out which parts of the original image have a possible target object or part of a target object. Max pooling can then be used to down sample the array. The reduced array may then be used as input into another artificial neural network and the above processes can be repeated. The final artificial neural network (e.g., fully connected network) determines whether a given image comprises target object and, if so, which portion(s) of the image comprise the target object. It should be noted that the DLANN model may comprise multiple convolution, max-pooling, and full-connected layers. In addition, the trained DLANN model is able to tolerate shadows, variable image backgrounds, exposure settings, and changing scene lighting, etc.

Once the object detection model has been trained, the application manager 106 implements the model as an object detector 122. For example, the application manager 106 is programmed to detect a specific target object (e.g., weed, diseased vegetation, etc.) from captured images 124 utilizing the object detector 122. As the movable entity 102 travels along a vegetation area (e.g., crop bed 208, turf area, etc.), the imaging device(s) 126 captures one or more images/frames 124 of the vegetation area and stores these images within a storage device. In some embodiments, the size of the image corresponds to the coverage area of the applicators 114. The images may be captured at this sized or may be resampled.

The ODS 120 of the application manager 106 processes and analyzes the captured images 124 and determines if the capture image(s) 124 comprises target vegetation (e.g., nutsedge, diseased vegetation, crabgrass, etc.). If the ODS 120 determines that the image 124 comprises target vegetation, the ODS 120 also determines the position of the target vegetation within the images(s) 124. The position of the target vegetation within the images(s) 124 may be determined by one or more trained layers within object detector 122. In one embodiment, positional data comprises coordinates within the images(s) 124 corresponding to the location of the detected target vegetation. In another embodiment, the image 124 is divided into a grid similar to the image shown in FIG. 4 and a grid section such as (Section_C3) is outputted as at least part of the positional data.

When the application manager 106 determines that target vegetation has been detected within the captured image 124 of the vegetation area (e.g. crop bed 208, turfgrass, etc.), the application manager 106 utilizes the positional data outputted by the ODS 120 and the configuration data 112 to selectively apply an agrochemical to the detected target vegetation. For example, if the AAS 104 implements an applicator grid or an applicator(s) with multiple nozzles, the application manager 106 compares the image positional data to applicator mapping information within the configuration data 112. The applicator mapping information identifies each applicator (or its nozzle) within the grid and the sections of an image assigned to each applicator, where the sections are defined by coordinates, pixels, section IDs, and/or the like. The applicator mapping information utilizes this information to identify the particular applicator/nozzle that needs to be activated for selectively applying the agrochemical to the location of the vegetation area (e.g., crop bed 208, turfgrass, etc.) identified within the image 124.

In addition to identifying the specific applicator/nozzle, the application manager 106 obtains additional configuration information for the applicator/nozzle from the configuration data 112. For example, the application manager 106 further analyzes the configuration data 112 to determine the distance between the applicator/nozzle and the imaging device 126, the distance between the applicator/nozzle and the vegetation area (e.g., crop bed 208, turfgrass, etc.), the spray rate of the applicator/nozzle, and/or the like. The application manager 106 also obtains the current speed of the AAS 104 from the LDS 108. Based on this data, the application manager 106 determines when to activate the applicator/nozzle or how much to delay the applicator/nozzle upon receiving an activation signal.

For example, using the information discussed above, the application manager 106 determines how much time it will take until the detected target vegetation is within range of the identified the applicator/nozzle, how much time it will take for the agrochemical to reach the vegetation area (e.g., crop bed 208, turfgrass, etc.) upon applicator/nozzle application, and/or the like. Using this information, the application manager 106 activates the identified applicator/nozzle such that the identified applicator/nozzle applies the agrochemical to the detected target vegetation as the target vegetation comes into range of the applicator/nozzle. The application manager 106 is able to send the activation signal at the moment the identified applicator/nozzle is to apply the agrochemical to the target vegetation. In another embodiment, the application manager 106 sends the activation signal immediately upon identifying the applicator/nozzle along with a delay instruction/data. In this embodiment, the applicator/nozzle activates (via an internal mechanism or by a signal generated by the controller 128) only after a delay timer, which is configured by the delay instruction/data, expires.

In one embodiment, the application manager 106 records agrochemical application data. For example, when the ODS 120 detects target vegetation within an image 124 the application manager 106 records the location where the target vegetation was detected using location data 132 obtained from the LDS 108. The application manager 106 may optionally record at least an identifier associated with the applicator/nozzle that it selected to apply the agrochemical to the detected the target vegetation. According to various embodiments, the application manager 106 and/or GIS module 146 can generate a map identifying the various locations at which the target vegetation was detected. In some embodiments, the applicator(s) 114 comprises a mechanism that is able to generate a feedback signal that is detected by the application manager 106. The application manager 106 utilizes this feedback signal to determine if the applicator 114 properly activated to apply the agrochemical to the detected target vegetation. In a further embodiment, a dye or other product may be added to the agrochemical. In this embodiment, the ODS 120 is trained to detect the dye/product. If the dye/product is detected by the ODS 120, the application manager 106 is able to determine the agrochemical was applied by the applicator 114. In one or more embodiments, the dye/product may not be visible to the human eye, but is detectable by an infrared camera, ultraviolet camera, and/or the like implemented within the imaging system 110. The applicator manager 106 is able to augment the generated map using the above information to indicate whether an agrochemical was applied to the target vegetation illustrated in the map.

The various embodiments of the present disclosure discussed above are advantageous over conventional agrochemical application systems because these embodiments reduce crop/turf damage, avoid introducing unwanted chemicals into the crops/turf, decrease costs by preventing the waste of agrochemicals, and/or the like. For example, in a validation experiment, the object detector 122 was given 300 images of various crop beds. Spray decisions were scored based on nutsedge identification by model inference:

a) If nutsedge correctly identified=correct sprayer on
b) If nutsedge not identified=incorrect sprayer off
c) If ID box with no nutsedge=incorrect sprayer on
d) If no ID box and no nutsedge correct sprayer off The cumulative scores of the input images were pooled and converted to percentages. The accuracy of spray decisions was as follows:

| a) | Incorrect OFF | 5% (unsprayed nutsedge) |
| b) | Incorrect ON | 1% (unnecessary herbicide use, crop phyto) |
| c) | Correct ON or OFF | 94% |

The overall accuracy for correct decisions was as follows:

a) Correct ON (100-1): 99%
b) Correct OFF)100-5) 95%

In the above example, the potential herbicide saving based on percentage of OFF decisions was 44% as calculated by $$\frac{(\# \ correctOFF + \# \ incorrectOFF)}{300 \ \{total\}} \times 100.$$

Figure 5:
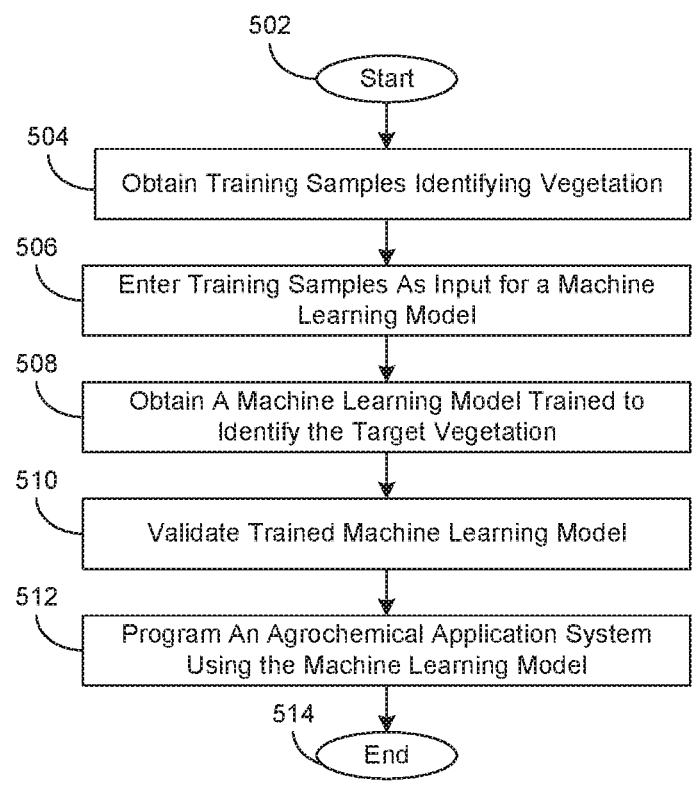
FIG. 5 is an operational flow diagram illustrating one example of programming an agrochemical application system to detect and manage target vegetation according to one embodiment of the present disclosure.

FIG. 5 is an operational flow diagram illustrating one example of programming an agrochemical application system 104 to detect and manage target vegetation according to one embodiment of the present disclosure. The operational flow diagram of FIG. 5 begins at step 502 and flows directly to step 504. The application manager 106, at step 504, obtains training samples identifying target vegetation. The application manager 106, at step 506, enters training samples as input for a machine learning model. The application manager 106, at step 508, obtains a machine learning model trained to identify the target vegetation based on the training samples. The application manager 106, at step 510, validates the trained machine learning model. The application manager 106, at step 512, programs an agrochemical application system 104 using the machine learning model. The control flow exits at step 514.

Figure 6:
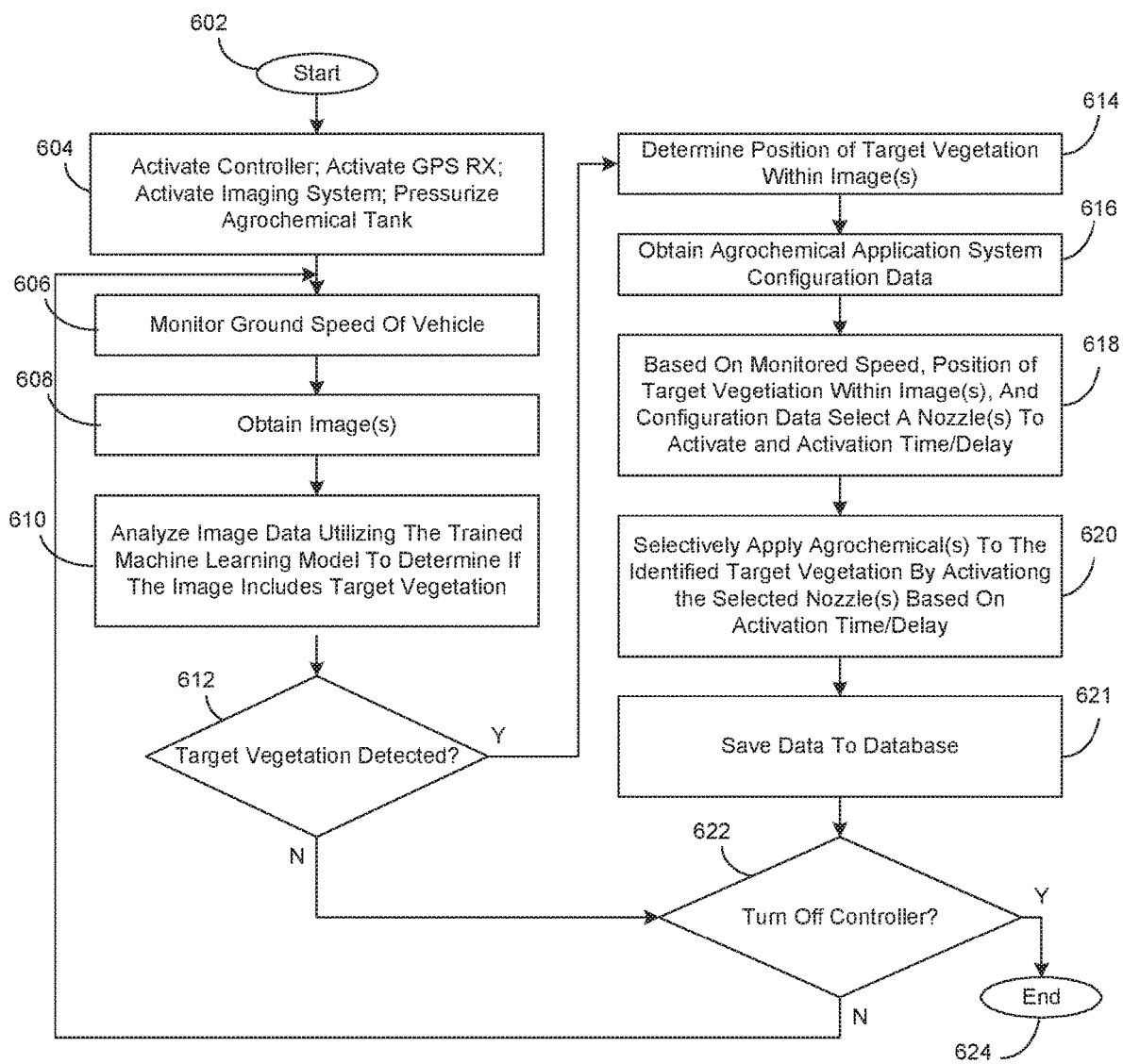
FIG. 6 is an operational flow diagram illustrating one example of detecting and managing target vegetation according to one embodiment of the present disclosure.

FIG. 6 is an operational flow diagram illustrating one example of detecting and managing target vegetation according to one embodiment of the present disclosure. The operational flow diagram of FIG. 6 begins at step 602 and flows directly to step 604. The application manager 106, at step 604, activates any optional controllers, a GPS module, an imaging system, and pressurizes an agrochemical holding tank if needed. The application manager 106, at step 606, monitors the ground speed of the movable entity. The application manager 106, at step 608, obtains one or more images of a crop bed.

The application manager 106, at step 610, analyzes the image data utilizing a trained machine learning model to determine if the image comprises target vegetation. The application manager 106, at step 612, determines if the image comprises target vegetation. If the result of this determination is negative, the control flows to step 622. If the result of this determination is positive, the application manager 106, at step 614, determines the position of the target vegetation within the image.

The application manager 106, at step 616, obtains agrochemical application system configuration data 112. The application manager 106, at step 618, selects an applicator (or nozzle) to activate any required activation time or delay based on the monitored ground speed, position of the target vegetation within the image, and the configuration data. The application manager 106, at step 620, selectively applies an agrochemical to the detected target vegetation by activating the selected applicator(s) (or nozzles(s)), where the activation may be based on any determined activation time and/or delay. The application manager 106, at step 621, saves the calculated, obtained, and/or recorded data associated with detection and/or management of the targeted vegetation in the database 136. As previously discussed, this data can be used to generate maps that can be used to verify areas of treatment and identify areas susceptible for re-occurrence. For example, maps generated using the data stored in the database can be used to identify areas that may need additional treatment to prevent and/or minimize reoccurrence. The application manager 106, at step 622, determines if the optional controller should be turned off. If the result of this determination is positive, the application manager 106, at step 624, turns off the optional controller and the control flow exits. If the result of this determination is negative, the control flow returns to step 606.

Figure 7:
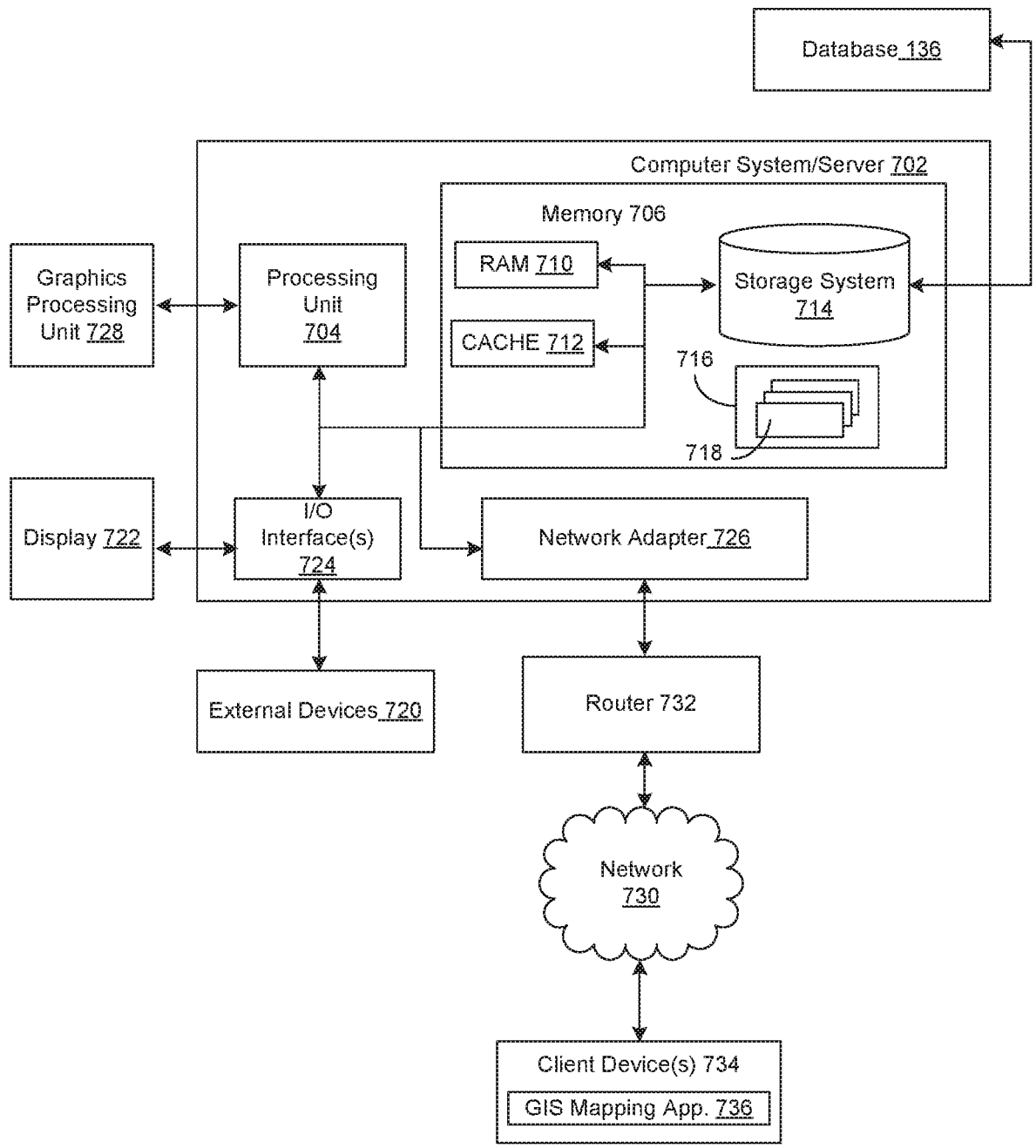
FIG. 7 is a block diagram illustrating one example of an information processing system according to one embodiment of the present disclosure.

Referring now to FIG. 7, this figure is a block diagram illustrating an information processing system that can be utilized in embodiments of the present disclosure. The information processing system 702 is based upon a suitably configured processing system configured to implement one or more embodiments of the present disclosure such as the application manager 106 of FIG. 1. The components of the information processing system 702 can include, but are not limited to, one or more processors or processing units 704, a system memory 706, and a bus 708 that couples various system components including the system memory 706 to the processor 704. The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. In some embodiments, the system 702 comprises and/or is communicatively coupled to one or more dedicated graphics processing units (GPUs) 728 optimized for rapid deep learning inference operations on digital images.

The system memory 706 may include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present disclosure.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present disclosure.

The information processing system 702 can also communicate with one or more external devices 720 such as a keyboard, a pointing device, a display 722, etc.; one or more devices that enable a user to interact with the information processing system 702; and/or any devices (e.g., network card, modem, router 732, etc.) that enable computer system/server 702 to communicate with one or more other computing devices. Such communication can occur via I/O interfaces 724. Still yet, the information processing system 702 can communicate with one or more networks 730 such as a local area network (LAN), a general wide area network (WAN), and/or a public network (e.g., the Internet) via network adapter 726. As depicted, the network adapter 726 communicates with the other components of information processing system 1002 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

The information processing system 702 can also communicate with at least one client device 734. The client device 734 is representative of one or more client devices that may be coupled to the network 730. The client device 734 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 734 may be configured to execute various applications such as a GIS mapping application 736 and/or other applications. The GIS mapping application 130 may be executed in a client device 734, for example, to access content served up by the information processing system 702. In some embodiments, the mapped visualization of the data stored in the database 136 can transfer to the client device 734 over the network 730. For example, the GIS application 130 can render user interfaces that can display the maps identifying the areas where targeted vegetation was detected and treatment was performed.

Figure 8:
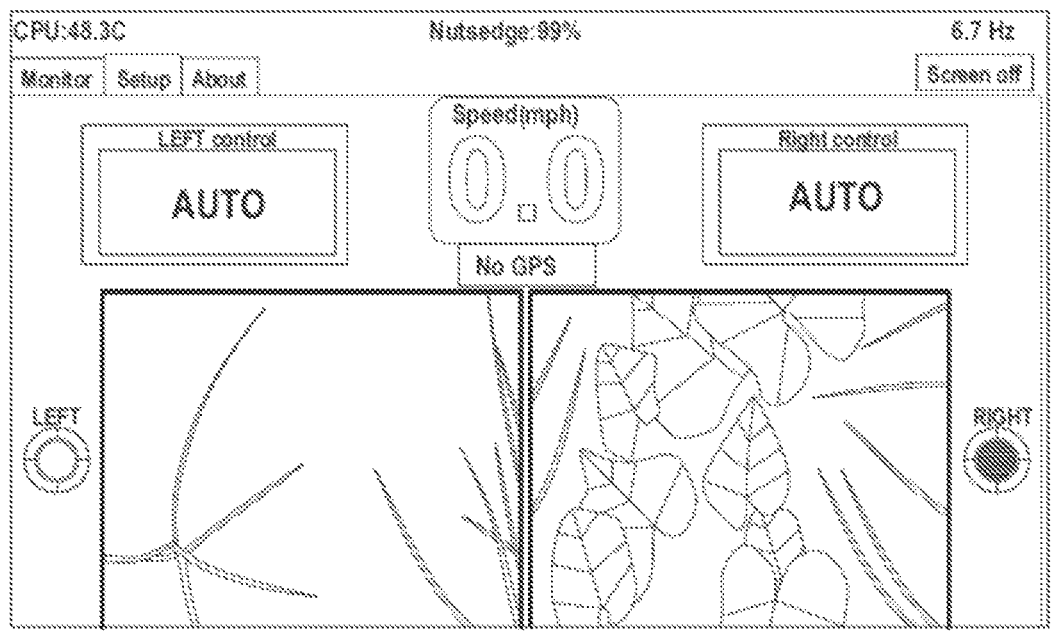
FIGS. 8, 9A, and 9B are drawings of example user interfaces rendered by a computing device according to various embodiments of the present disclosure.
Figure 9A:
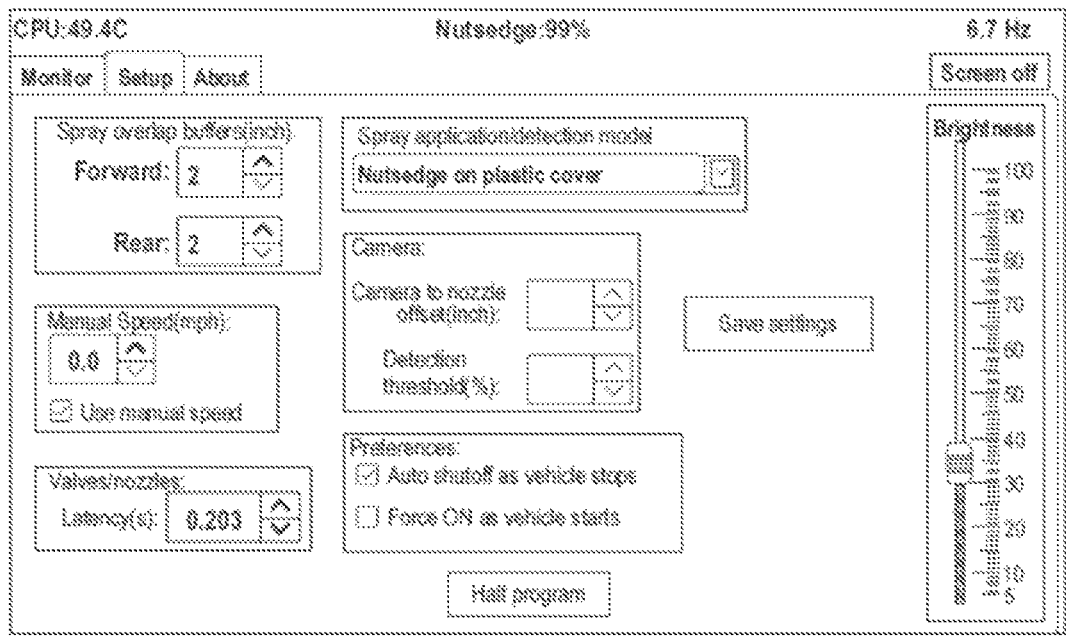
Figure 9B:
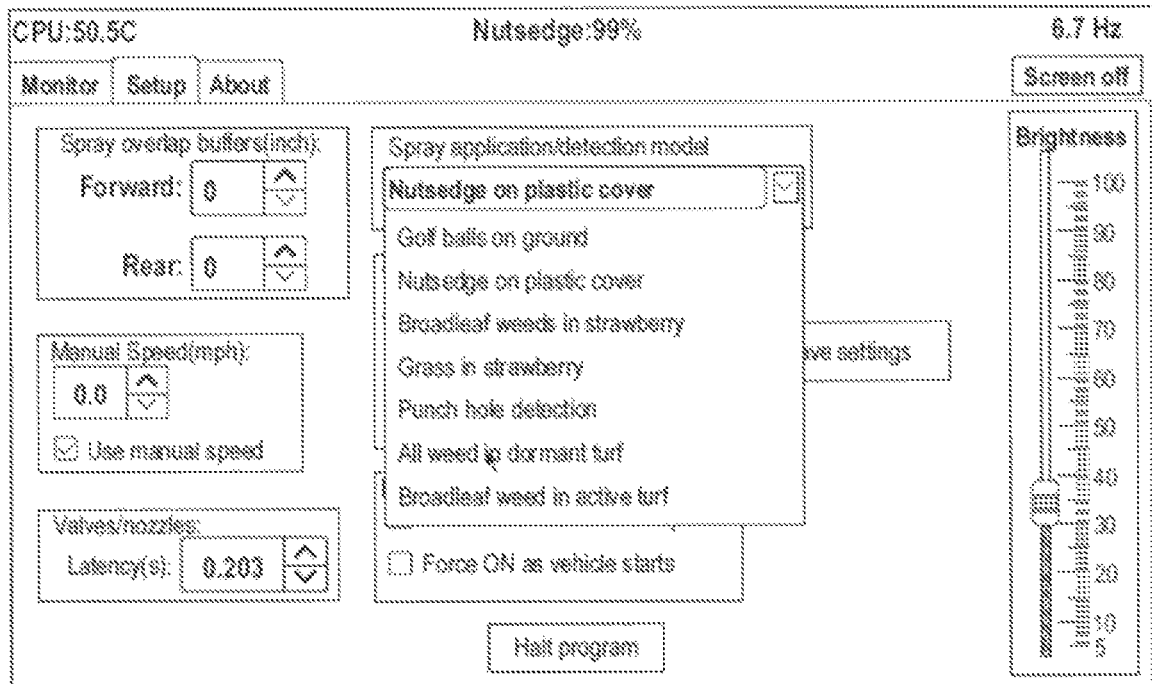
Figure 10A:
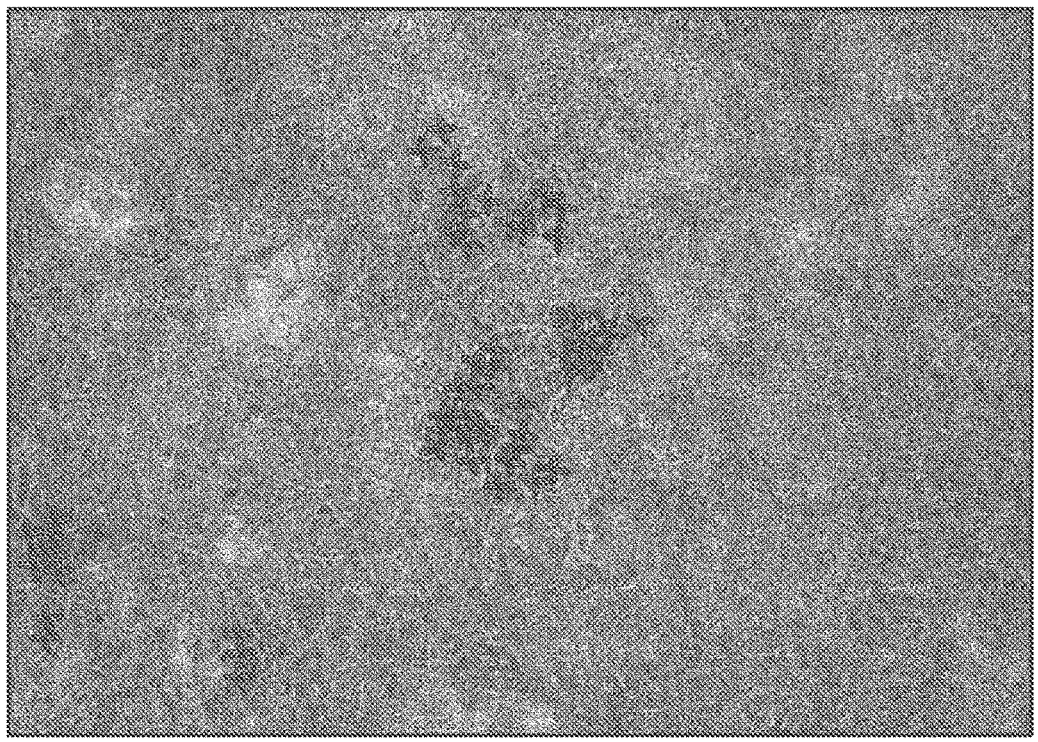
Figure 10B:
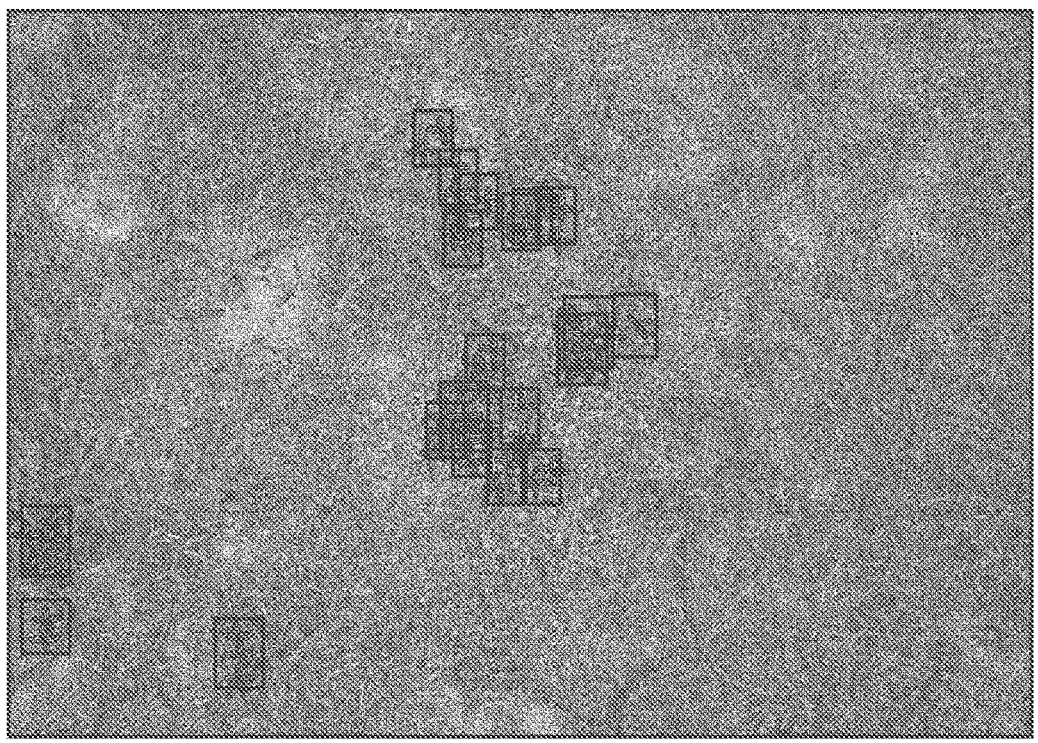
Figure 11A:
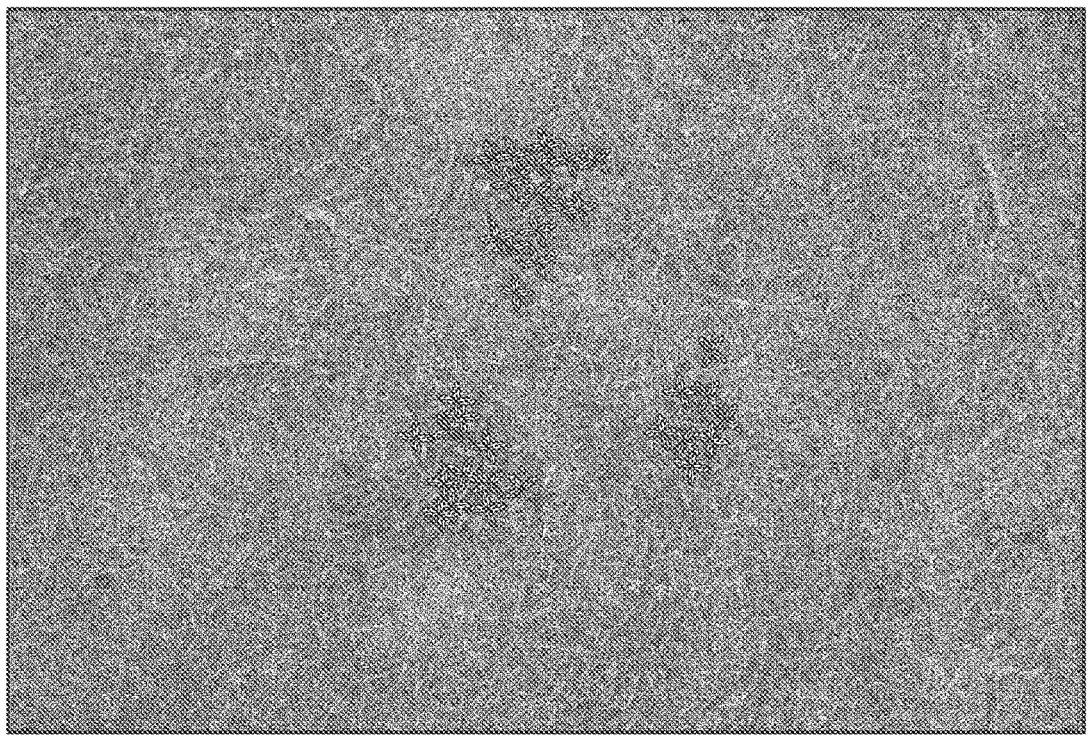
Figure 11B:
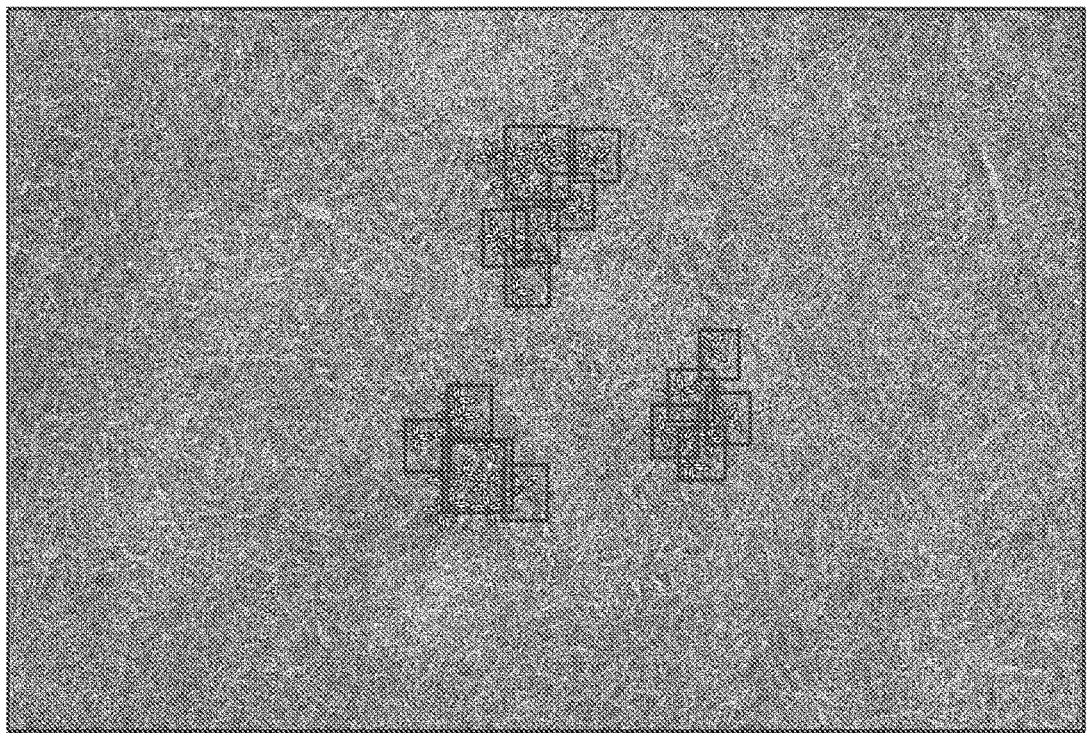
Figure 12A:
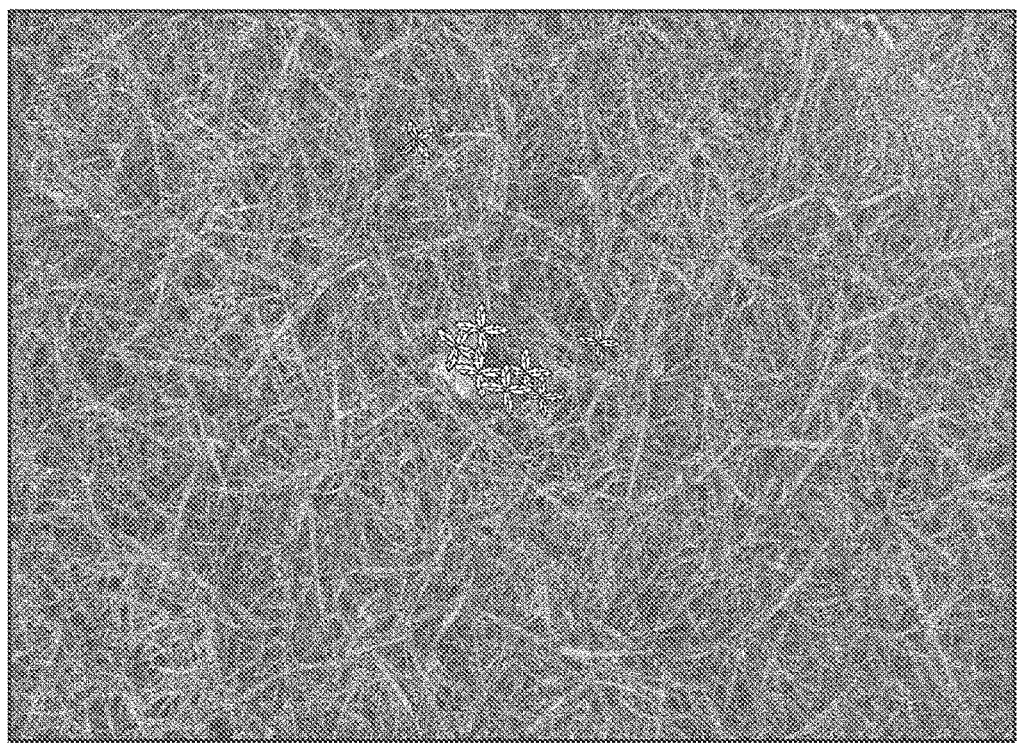
Figure 12B:
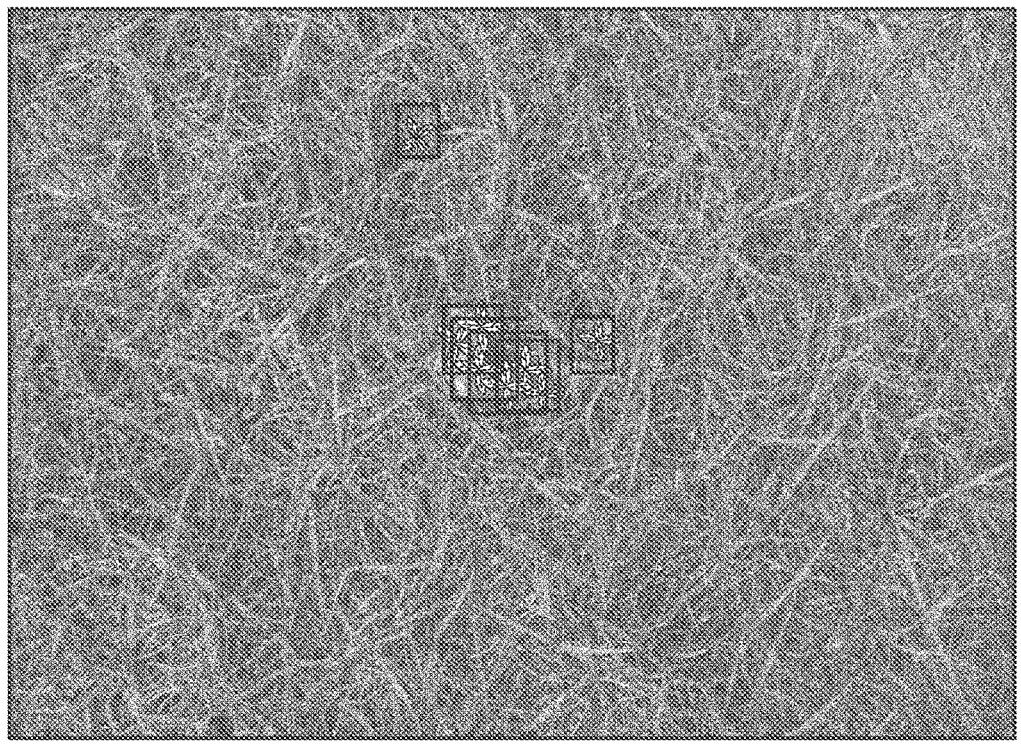
Figure 13A:
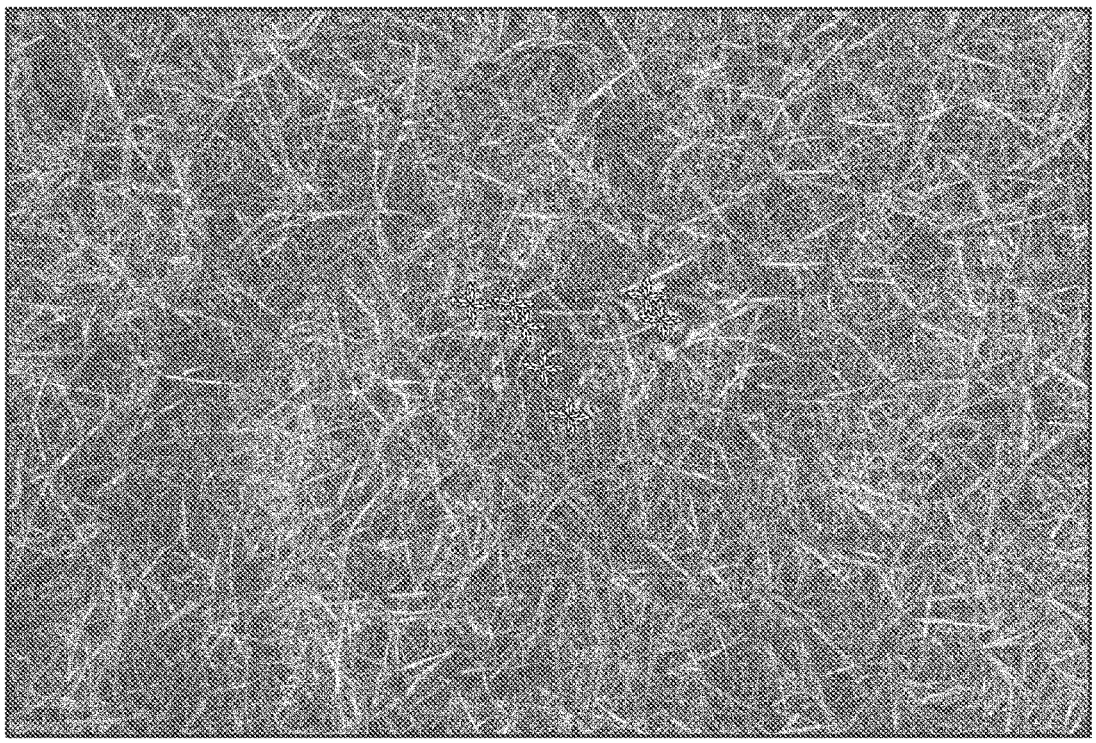
Figure 13B:
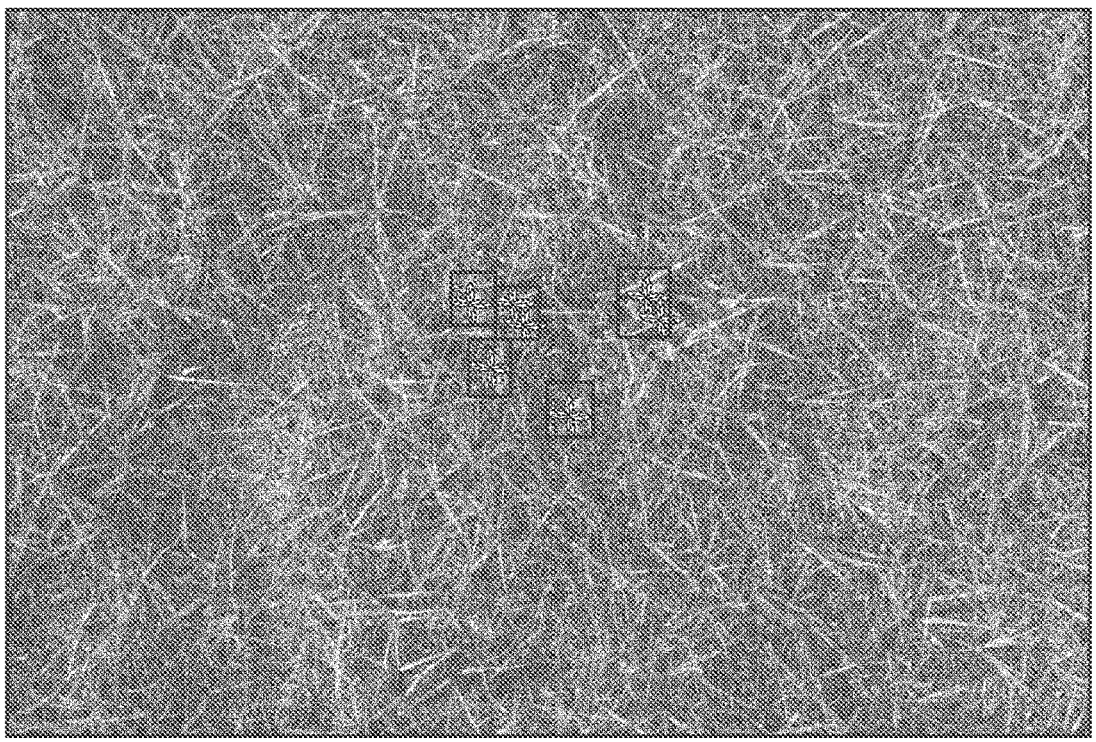

FIGS. 8, 9A, and 9B show drawings of example user interfaces that can be used to configure the AAS 104 for particular applications according to various embodiments. For example, FIG. 8 illustrates a drawing of an example user interface of a main screen that can be rendered on the display 722 of the information processing system 702. FIGS. 9A and 9B illustrate drawings of example user interfaces that provide selectable components that can be used to configured the AAS 104 For example, FIG. 9A illustrates a user interface with components that allow for selection of various configuration parameters (e.g., spray overlap buffers, speed, nozzle latency, camera controls, etc.). The configuration screens of FIGS. 9A and 9B further include a dropdown box for selecting a pre-trained deep learning model from a list of designated applications. The applications shown in the drop box include various weed control situations in vegetables and strawberry and turfgrass. However, the present disclosure is not limited to the applications shown in the example user interfaces. For example, disease control, among others, is another application that can also be included.

As will be appreciated by one skilled in the art, aspects of the present disclosure may be embodied as a system, method, or computer program product. Accordingly, one or more aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server or on a dedicated graphics processing unit (GPU) optimized for rapid deep learning inference operations on digital images. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present disclosure can be further understood with reference to FIGS. 10A-13B. FIGS. 10A, 11A, 12A, and 13A illustrate examples images of vegetation, and FIGS. 10B, 11B, 12B, and 13B illustrate examples images showing detection of the unwanted vegetation in the images according to various embodiments of the present disclosure. In particular, the AAS 104 can analyze the photos to determine an area of vegetation that includes undesirable vegetation, as can be appreciated by the disclosure.

In addition to the foregoing, the various embodiments of the present disclosure include, but are not limited to, the embodiments set for in the following clauses.

Clause 1. A system for detecting and managing target vegetation, the system comprising: a moveable entity; and an agrochemical applicator system mechanically coupled to the moveable entity, the agrochemical applicator system comprising: a computing device; an imaging system in data communication with the computing device; at least one applicator for applying an agrochemical to the target vegetation, the at least one applicator being in data communication with the computing device; and at least one application executable by the computing device, wherein when executed, the at least one application causes the computing device to at least: detect target vegetation within one or more images captured by the imaging system, the target vegetation being detected using a trained machine learning model; determine a position of the detected target vegetation within the one or more images; and activate the at least one applicator according to a current speed of the moveable entity, activating the at least one applicator selectively applies an agrochemical to the detected target vegetation.

Clause 2. The system of clause 1, further comprising a database, and wherein, when executed, the at least one application further causes the computing device to at least: store in the database at least one of: a date of application of the agrochemical to the detected target vegetation, a location of an application of the agrochemical to the detected target vegetation, the current speed, the one or more images, an amount of agrochemical used on the detected target vegetation, and identified object names within the one or more images.

Clause 3. The system of clause 2, further comprising a geographic information system (GIS), the GIS being configured to generate one or more maps associated with the targeted vegetation based at least in part on data stored in the database.

Clause 4. The system of any one of clauses 1-3, wherein the at least one applicator further comprises a plurality of applicators, and wherein, when executed, the at least one application causes the computing device to at least select a particular applicator from the plurality of applicators based at least in part on a location of the detected vegetation and a position of the particular applicator, activating the at least one applicator comprises activating the particular applicator.

Clause 5. The system of any one of clauses 1-4, wherein determining the position of the detected targeted vegetation is based at least in part on a location determining system data and pixel coordinates of the detected vegetation.

Clause 6. The system of any one of clauses 1-5, wherein the agrochemical applicator system further comprises one or more tanks holding the agrochemical.

Clause 7. The system of any one of clauses 1-6, wherein the one or more images are of a vegetation area comprising at least one of: a crop bed, an area between two crop beds, or turfgrass.

Clause 8. A method for detecting and managing target vegetation within a vegetation area, the method comprising: capturing one or more images of the vegetation area via an imaging device; detecting target vegetation within the one or more images; determining a position of the detected target vegetation within the one or more images; determining an applicator disposed on an agrochemical applicator system that is mapped to the position of the detected target vegetation within the one or more images; and activating the applicator based on a current speed of a vehicle coupled to the agrochemical applicator system, wherein activating the applicator selectively applies an agrochemical to the detected target vegetation.

Clause 9. The method of clause 8, wherein the vegetation area comprises at least one of turf grass, a crop bed, or an area between crop beds.

Clause 10. The method of any one of clauses 8 or 9, further comprising training a machine learning model to detect the target vegetation within the one or more images.

Clause 11. The method of clause 10, further comprising: programming an information processing system utilizing the machine learning model; and wherein the information processing system comprises one or more object detectors trained to identify the target vegetation within the one or more images and detect the target vegetation within the one or more images.

Clause 12. The method of any one of clauses 8-11, wherein activating the activator is further based at least in part on configuration data associated with the applicator.

Clause 13. The method of clause 12, wherein the configuration data comprises at least one of: a position of applicator relative to a position of the imaging device, a distance between the applicator and the imaging device, a dispensing angle of the applicator, a coverage area of the applicator, an actuation speed of the applicator, a field-of-view of the imaging device, a distance of the applicators from the ground, a location of the applicator on the agrochemical applicator system, or a mapping of the applicator to a portion of the field-of-view of the imaging device.

Clause 14. The method of clause 13, wherein the agrochemical applicator system comprises a motorized track, the applicator is coupled to the motorized track, and the configuration data further comprises at least one of: a speed of travel of the motorized track the applicator or a current position of the applicator on the track.

Clause 15. The method of any one of clauses 8-14, wherein the agrochemical applicator system comprises a global positioning system (GPS) module, and further comprising determining the speed of the vehicle via data obtained from the GPS module.

Clause 16. An agrochemical applicator system for detecting targeted vegetation, the agrochemical applicator system comprises: one or more applicators configured to dispense an agrochemical; an imaging system comprising at least one imaging device; and at least one application executable in a computing device, wherein, when executed, the at least one application causes the computing device to at least: detect target vegetation within one or more images utilizing a trained machine learning model, the one or more images being captured by the imaging system; determine a position of the detected target vegetation within the one or more images; determine that an applicator from the one or more applicators is mapped to the position of the detected target vegetation within the one or more images; and activating the applicator based at least in part on configuration data associated with the applicator, wherein activating the applicator selectively applies an agrochemical to the detected target vegetation.

Clause 17. The agrochemical applicator system of clause 16, wherein the agrochemical applicator system is coupled to a moveable vehicle, and activating the applicator is further based at least in part on a current speed of the moveable vehicle.

Clause 18. The agrochemical applicator system of any one of clauses 16-17, wherein, when executed, the at least one application further causes the computing device to at least train a machine learning model to detect target vegetation, the machine learning model being trained using training images of at least one of: a crop bed, an area between two crop beds, or turf grass.

Clause 19. The agrochemical applicator system of any one of clauses 16-18, further comprising a location determining system, the position of the detected target vegetation within the one or more images being determined based at least in part on based on data received from the location determining system.

Clause 20. The agrochemical applicator system of any one of clauses 16-19, further comprising a geographic information system (GIS), the GIS being configured to generate one or more maps associated with the targeted vegetation.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A detection and management system for detecting and managing target vegetation, the detection and management system comprising:
 a moveable entity; and
 an agrochemical applicator system mechanically coupled to the moveable entity, the agrochemical applicator system comprising:
  a computing device;
  an imaging system in data communication with the computing device;
  a plurality of applicators for applying an agrochemical to the target vegetation, the plurality of applicators being in data communication with the computing device; and
  at least one application executable by the computing device, wherein when executed, the at least one application causes the computing device to at least:
   detect the target vegetation within one or more images captured by the imaging system, the target vegetation being detected using a trained deep learning artificial neural network (DLANN) model;
   determine a position of the target vegetation within the one or more images; and
   comparing the position of the target vegetation with applicator mapping information associated with the plurality of applicators, the applicator mapping information identifying a respective region of the one or more images that is assigned to individual applicators of the plurality of applicators disposed on the agrochemical applicator system;
   identifying a particular applicator from the plurality of applicators that is mapped to the position of the target vegetation within the one or more images, the particular applicator being identified based at least in part on the comparison; and
   activate the particular applicator according to a current speed of the moveable entity, activating the particular applicator selectively applies the agrochemical to the target vegetation.

2. The detection and management system of claim 1, further comprising a database, and wherein, when executed, the at least one application further causes the computing device to at least:
 store in the database at least one of: a date of an application of the agrochemical to the target vegetation, a location of the application of the agrochemical to the target vegetation, the current speed, the one or more images, an amount of the agrochemical used on the target vegetation, and identified object names within the one or more images.

3. The detection and management system of claim 2, further comprising a geographic information system (GIS), the GIS being configured to generate one or more maps associated with the target vegetation based at least in part on data stored in the database.

4. The detection and management system of claim 1, wherein, when executed, the at least one application causes the computing device to at least select the particular applicator from the plurality of applicators based at least in part on a location of the target vegetation and a position of the particular applicator, activating the particular applicator.

5. The detection and management system of claim 1, wherein determining the position of the target vegetation is based at least in part on a location determining system data and pixel coordinates of the target vegetation.

6. The detection and management system of claim 1, wherein the agrochemical applicator system further comprises one or more tanks holding the agrochemical.

7. The detection and management system of claim 1, wherein the one or more images are of a vegetation area comprising at least one of: a crop bed, an area between two crop beds, or turfgrass.

8. A method for detecting and managing target vegetation within a vegetation area, the method comprising:
 capturing one or more images of the vegetation area via an imaging device;
 detecting the target vegetation within the one or more images using a neural network model;
 determining a position of the target vegetation within the one or more images;
 identifying a particular applicator of a plurality of applicators disposed on an agrochemical applicator system, the particular applicator being identified based at least in part on a comparison of the position of the target vegetation with applicator mapping information associated with the plurality of applicators, the applicator mapping information identifying a respective region of the one or more images that is assigned to individual applicators of the plurality of applicators, and the particular applicator being mapped to the position of the target vegetation; and
 activating the particular applicator based on a current speed of a vehicle coupled to the agrochemical applicator system, wherein activating the particular applicator selectively applies an agrochemical to the target vegetation.

9. The method of claim 8, wherein the vegetation area comprises at least one of turfgrass, a crop bed, or an area between crop beds.

10. The method of claim 8, further comprising training the neural network model to detect the target vegetation within the one or more images.

11. The method of claim 10, further comprising:
 programming an information processing system utilizing the the neural network model; and
 wherein the information processing system comprises one or more object detectors trained to identify the target vegetation within the one or more images and detect the target vegetation within the one or more images.

12. The method of claim 8, wherein activating the particular applicator is further based at least in part on configuration data associated with the particular applicator.

13. The method of claim 12, wherein the configuration data comprises at least one of: a position of the particular applicator relative to a position of the imaging device, a distance between the particular applicator and the imaging device, a dispensing angle of the particular applicator, a coverage area of the particular applicator, an actuation speed of the particular applicator, a field-of-view of the imaging device, a distance of the particular applicator from a ground, a location of the particular applicator on the agrochemical applicator system, or a mapping of the particular applicator to a portion of the field-of-view of the imaging device.

14. The method of claim 13, wherein the agrochemical applicator system comprises a motorized track, the particular applicator is coupled to the motorized track, and the configuration data further comprises at least one of: a speed of travel of the motorized track coupled to the particular applicator or a current position of the particular applicator on the motorized track.

15. The method of claim 8, wherein the agrochemical applicator system comprises a global positioning system (GPS) module, and further comprising determining the current speed of the vehicle via data obtained from the GPS module.

16. An agrochemical applicator system for detecting target vegetation, the agrochemical applicator system comprises:
one or more applicators configured to dispense an agrochemical;
an imaging system comprising at least one imaging device; and
at least one application executable in a computing device, wherein, when executed, the at least one application causes the computing device to at least:
detect the target vegetation within one or more images utilizing a trained neural network model, the one or more images being captured by the imaging system;
determine a position of the target vegetation within the one or more images;
determine that a particular applicator from the one or more applicators is mapped to the position of the target vegetation within the one or more images based at least in part on a comparison of the position of the target vegetation with applicator mapping information associated with the one or more applicators, the applicator mapping information identifying a respective region of the one or more images that is assigned to individual applicators of the one or more applicators; and
activating the particular applicator based at least in part on configuration data associated with the particular applicator, wherein activating the particular applicator selectively applies the agrochemical to the target vegetation.

17. The agrochemical applicator system of claim 16, wherein the agrochemical applicator system is coupled to a moveable vehicle, and activating the particular applicator is further based at least in part on a current speed of the moveable vehicle.

18. The agrochemical applicator system of claim 16, wherein, when executed, the at least one application further causes the computing device to perform training to generate the trained neural network model to detect the target vegetation, the trained neural network model being trained using training images of at least one of: a crop bed, an area between two crop beds, or turfgrass.

19. The agrochemical applicator system of claim 16, further comprising a location determining system, the position of the target vegetation within the one or more images being determined based at least in part on data received from the location determining system.

20. The agrochemical applicator system of claim 16, further comprising a geographic information system (GIS), the GIS being configured to generate one or more maps associated with the target vegetation.

* * * * *